(12) United States Patent
Viera et al.

(10) Patent No.: US 9,128,494 B2
(45) Date of Patent: Sep. 8, 2015

(54) APPARATUS AND METHOD FOR ASSESSING VOLUMETRIC MOISTURE CONTENT AND CONTROLLING AN IRRIGATOR

(71) Applicant: Microsemi Corporation, Aliso Viejo, CA (US)

(72) Inventors: Joseph Andrew Viera, Manchester, NH (US); Heyward Sturges Williams, Derry, NH (US)

(73) Assignee: Microsemi Corporation, Aliso Viejo, CA (US)

( * ) Notice: Subject to any disclaimer, the term of this patent is extended or adjusted under 35 U.S.C. 154(b) by 420 days.

(21) Appl. No.: 13/665,871

(22) Filed: Oct. 31, 2012

(65) Prior Publication Data

US 2013/0131875 A1    May 23, 2013

Related U.S. Application Data

(60) Provisional application No. 61/560,819, filed on Nov. 17, 2011.

(51) Int. Cl.
| | |
|---|---|
| *G05D 11/00* | (2006.01) |
| *G05D 22/02* | (2006.01) |
| *A01G 25/16* | (2006.01) |

(52) U.S. Cl.
CPC ............... *G05D 22/02* (2013.01); *A01G 25/16* (2013.01)

(58) Field of Classification Search
None
See application file for complete search history.

(56) References Cited

U.S. PATENT DOCUMENTS

| | | | |
|---|---|---|---|
| 2,659,860 | A | 11/1953 | Breazeale |
| 3,735,398 | A | 5/1973 | Ross |
| 4,135,131 | A | 1/1979 | Larsen |
| 4,361,801 | A | 11/1982 | Meyer |
| 4,918,375 | A | 4/1990 | Malicki |
| 5,148,125 | A | 9/1992 | Woodhead |
| 5,256,978 | A | 10/1993 | Rose |
| 5,341,673 | A | 8/1994 | Burns |
| 5,726,578 | A | 3/1998 | Hook |
| 5,818,214 | A | 10/1998 | Pelly |
| 5,845,529 | A | 12/1998 | Moshe |
| 5,939,888 | A | 8/1999 | Nelson |

(Continued)

OTHER PUBLICATIONS

Sevgi, Levent; "The Antenna as a Transducer: Simple Circuit and Electromagnetic Models"; IEEE Antennas and Propagation Magazine, vol. 49, No. 6, Dec. 2007; pp. 211-218; IEEE, New York, NY.

(Continued)

*Primary Examiner* — Robert Fennema
*Assistant Examiner* — Jay Jung
(74) *Attorney, Agent, or Firm* — Simon Kahn

(57) ABSTRACT

An apparatus for assessing at least one property of a target soil responsive to a first a first microwave signal, constituted of: a detector; a probe arranged to be embedded in the target soil; and a coupler arranged to couple a first portion of the first microwave signal to the first end of the probe, and to couple a second portion of the generated first microwave signal as a microwave reference signal to a reference input of the detector; the detector arranged to square each of the microwave signal exiting the probe and the microwave reference signal and to output a phase difference signal indicative of the phase difference between the squared probe output microwave signal and the squared microwave reference signal; and a control circuitry coupled to the output of the detector and arranged to output an irrigation control signal responsive to the phase difference signal.

15 Claims, 5 Drawing Sheets

(56) References Cited

U.S. PATENT DOCUMENTS

| | | |
|---|---|---|
| 6,107,809 A | 8/2000 | Moshe |
| 6,111,415 A | 8/2000 | Moshe |
| 6,147,503 A | 11/2000 | Nelson |
| 6,344,795 B1 * | 2/2002 | Gehlot .......................... 340/540 |
| 6,466,168 B1 | 10/2002 | McEwan |
| 6,476,619 B1 | 11/2002 | Moshe |
| 6,657,443 B2 | 12/2003 | Anderson |
| 7,078,913 B1 | 7/2006 | Pelletier |
| 7,135,871 B1 * | 11/2006 | Pelletier ........................ 324/640 |
| 7,254,493 B1 | 8/2007 | Pelletier |
| 7,330,034 B1 * | 2/2008 | Pelletier et al. ............... 324/640 |
| 7,570,200 B2 | 8/2009 | Niedzwiecki |
| 2008/0097653 A1 * | 4/2008 | Kaprielian et al. ........... 700/284 |
| 2011/0008061 A1 * | 1/2011 | Fujii ............................ 398/203 |

OTHER PUBLICATIONS

Wanjura, et al; U.S. Appl. No. 13/214,576 entitled "Interrogation Measurement System and Method Providing Accurate Permittivity Measurements Via Ultra-Wideband Removal of Spurious Reflectors".

* cited by examiner

_US 9,128,494 B2_

APPARATUS AND METHOD FOR ASSESSING VOLUMETRIC MOISTURE CONTENT AND CONTROLLING AN IRRIGATOR

CROSS-REFERENCE TO RELATED APPLICATION

This application claims priority from provisional patent application Ser. No. 61/560,819 filed Nov. 17, 2011, entitled "Apparatus and Method for Assesing Volumetric Moisture Content and Controlling and Irrigator", the entire contents of which is incorporated herein by reference.

TECHNICAL FIELD

The present application relates to an apparatus and a method for assessing volumetric moisture content of soil responsive to a microwave signal.

BACKGROUND OF THE INVENTION

Evaluation of soil moisture content and electrical conductivity are two of the parameters necessary for efficient control of irrigation, fertilization of crops and turf production and maintenance. Presently, the most effective and widely used means of assessing soil moisture content is through the use of Time Domain Reflectometry (TDR), which assesses the dielectric constant of soil responsive to an electrical signal travelling into the soil along a conductor, the signal reflected back towards the transmitter. Over the past 20 years many researchers have proven the accuracy of assessing soil moisture content through the estimation of dielectric constant.

Using traditional TDR measurements has a disadvantage in that creating and receiving the TDR signal requires expensive circuitry to construct the output and receive signals. Several inventions such as U.S. Pat. No. 5,818,214 issued Oct. 6, 1998 to Pelly et al, the entire contents of which is incorporated herein by reference, have been developed which have attempted to reduce the cost and complexity of transmitting a TDR signal with marginal improvements.

TDR technology utilizes an extremely fast rise time pulse which is transmitted through an open ended wave guide structure. The pulse promulgates down the wave guide structure and the soil it is in contact with and the corresponding return signal is delayed by the dielectric constant of the soil. The generation of the TDR signal and the equipment required to analyze the return signal has limited the use of this technique to research and scientific applications.

Other patents have attempted to reduce cost and have offered alternative methods to measure the dielectric constant of soils. U.S. Pat. No. 5,148,125 issued Sep. 15, 1992 to Woodhead et al, the entire contents of which is incorporated herein by reference, utilizes a buried transmission line coupled to an oscillator. The buried transmission line forms part of a feedback loop of the amplifier, and the resultant frequency of the circuit is responsive to the dielectric constant of the material in which the transmission line is embedded. This method is reliable under laboratory conditions where environmental conditions and homogeneity of the material being tested can be tightly controlled, but is not overly successful in the field.

Other sensors have employed methods which measure the resistance and capacitance of the soils through the use of specialized probes coupled to either timing or resonance circuits such as U.S. Pat. No. 5,341,673 issued Aug. 30, 1994 to Burns et al, the entire contents of which is incorporated herein by reference. The main limitation with these sensor approaches is the susceptibility of soil salinity to influence the measurements, thus degrading the repeatability of accurate soil moisture content when fertilization contents are applied to the subject fields or plots. The various mentioned sensors operate at frequency ranges below 300 MHz, and thus do not take advantage of the tendency of microwave frequencies to reduce the dependence of measurement on soil salinity.

U.S. Pat. No. 2,659,860 issued Nov. 17, 1953 to Breazeale, the entire contents of which is incorporated herein by reference, describes a method of measurement of moisture content of materials by propagating a 10 GHz microwave signal in a thru path configuration and determining the moisture content through the measurement of the attenuation through the material.

U.S. Pat. No. 4,361,801 issued Nov. 30, 1982 to Meyer et al, the entire contents of which is incorporated herein by reference, describes a technique that uses a 9 GHz signal to measure both the attenuation and phase delay to calculate the moisture content independent of material density. Meyer et al, determine the Volumetric Water Content by measuring the magnitude and phase information and generating a complex quantity which represents the dielectric constant and complex permittivity of the material under test. This method is disadvantageous due to the costs associated with the signal reception and generation components.

U.S. Pat. No. 6,147,503 issued Nov. 14, 2000 to Nelson et al, the entire contents of which is incorporated herein by reference, describes a method that is also independent of a narrow range of densities using a propagation frequency of 11.3 GHz and 18 GHz to calculate the permittivity for the determination of the moisture content of the materials under test. U.S. Pat. Nos. 6,476,619 issued Nov. 5, 2002 to Moshe et al; 6,111,415 issued Aug. 29, 2000 to Moshe; 5,845,529 issued Dec. 8, 1998 to Moshe et al; 6,107,809 issued Aug. 22, 2000 to Moshe et al; and 4,361,801 issued Nov. 30, 1982 to Meyer et al, the entire contents of each of which are incorporated herein by reference, all typically operate at microwave frequencies above 7 GHz. Again disadvantageously, the costs associated with the generation and reception of the magnitude and phase components of the signals are very high.

U.S. Pat. No. 7,135,871 issued Nov. 14, 2006 to Pelletier, the entire contents of which is incorporated herein by reference, describes a method which generates a varying microwave frequency with the suggested use of an oven stabilized VCO to produce the primary microwave frequencies of 1.8 GHz to 2.5 GHz to determine the dielectric constant and complex permittivity and suggests the use of multiple VCOs or an Ultra Wide Band VCO spanning multiple octaves. The use of oven stabilized VCOs and the requirement of a VCO of multiple octaves in band width, to determine the electrical conductivity and the dielectric constant and complex permittivity are expensive to procure and difficult to develop without significant monetary costs. An alternative solution for a low cost, accurate technique for the determination of moisture content and electrical conductivity is thus desired.

SUMMARY

In view of the discussion provided above and other considerations, the present disclosure provides methods and apparatus to overcome some or all of the disadvantages of prior and present systems, apparatuses and methods for assessing volumetric moisture content and controlling an irrigator. Other new and useful advantages of the present methods and apparatus will also be described herein and can be appreciated by those skilled in the art.

In one embodiment an apparatus for assessing at least one property of a target soil is provided, the apparatus comprising: a microwave signal generator arranged to generate a first microwave signal; a detector; a probe comprising an electrical conductor exhibiting a first end and a second end removed from the first end, the probe arranged to be embedded in the target soil; and a coupler arranged to couple a first portion of the generated first microwave signal as a second microwave signal to the first end of the probe, and to couple a second portion of the generated first microwave signal as a microwave reference signal to a reference input of the detector, the second microwave signal exiting the second end of the probe as a third microwave signal, the second end of the probe carrying the third microwave signal connected to an input of the detector; the detector arranged to square each of the third microwave signal and the microwave reference signal and to output a phase difference signal indicative of the phase difference between the squared third microwave signal and the squared microwave reference signal; and a control circuitry coupled to the output of the detector and arranged to output an irrigation control signal responsive to the phase difference signal.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1A:
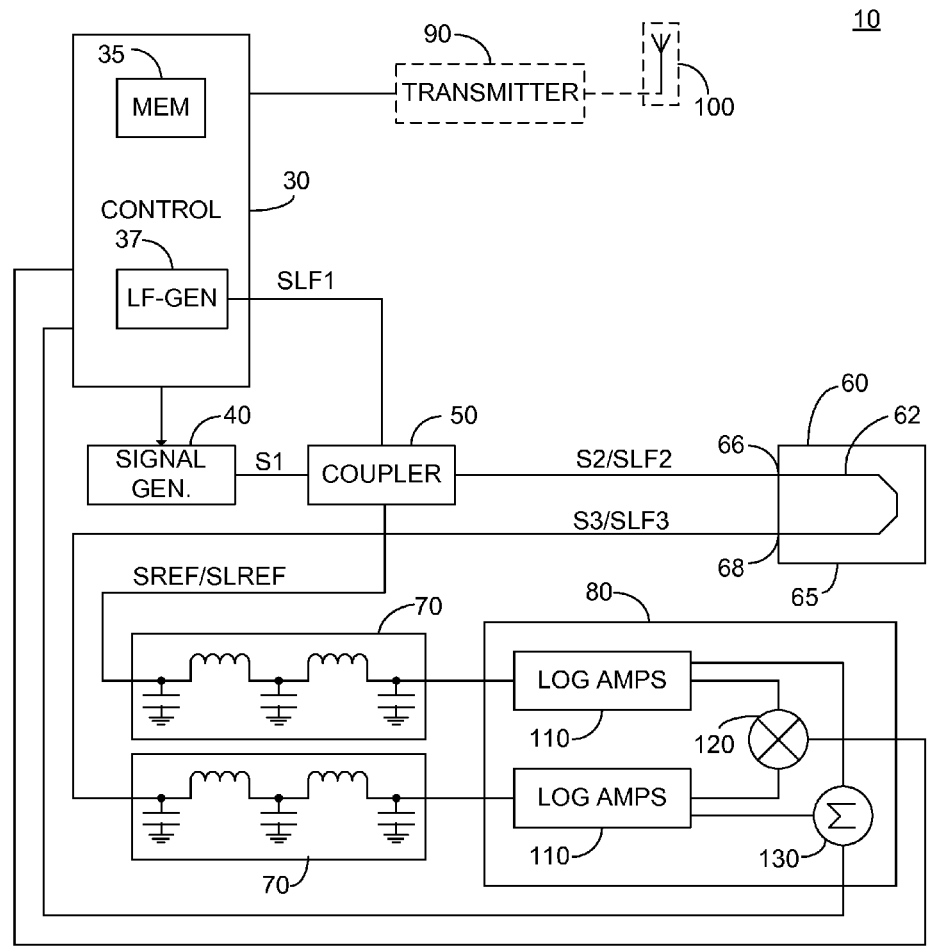
FIG. 1A illustrates a high level block diagram of an apparatus arranged to assess volumetric moisture content and salinity of a target soil and further control irrigation thereof, comprising a signal generator outputting a fixed frequency signal and a probe.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1A illustrates a high level block diagram of an apparatus 10 arranged to assess volumetric moisture content and salinity of a target soil and further control irrigation thereof, apparatus 10 comprising: a control circuitry 30, comprising a memory 35 and a low frequency signal generator 37, such as an internal clock generator; a signal generator 40; a coupler 50; a probe 60; a pair of optional harmonic filters 70; a detector 80; an optional wireless transmitter 90; and an optional antenna 100. Detector 80 comprises: a pair of logarithmic amplifiers 110; a phase detector 120; and a difference circuit 130. In one embodiment, detector 80 is implemented as an AD8302 RF/IF Gain and Phase detector commercially available from Analog Devices, Inc. of Norwood, Mass. In one embodiment, phase detector 120 is a multiplier exclusive OR type phase detector.

In one non-limiting embodiment, probe 60 comprises a transmission line 62 disposed on a substrate 65. In one particular embodiment, substrate 65 comprises a flame retardant fiberglass circuit board exhibiting a permittivity of 4.3, a thickness of 0.031 inches, a ground plane which is copper plated to a density of 1 oz per square centimeter, and a 50 ohm micro strip line of width 0.062" and 6" long formed as a loop from a first end 66 to a second end 67. Such a probe 60 exhibits a delay of 508 picoseconds in free space, however the specific layout and delay is not meant to be limiting in any way and is only described in order to illustrate the principles of operation of certain embodiments.

A first output of control circuitry 30 is coupled to the control input of signal generator 40 and the output of signal generator 40 is coupled to an input of coupler 50, the signal carried thereon denoted signal S1. A second output of control circuitry 30, in one non-limiting embodiment carrying a low frequency signal from low frequency generator 37, denoted SLF1, such as an internal clocking signal of control circuitry 30, is connected to a second input of coupler 50. A first output of coupler 50 is coupled to first end 66 of probe 60, the signal carried thereon denoted signal S2, and second end 68 of probe 60 is coupled to an input of a respective logarithmic amplifier 110 of detector 80 via a respective optional harmonic filter 70, the signal carried thereon from second end 68 denoted signal S3. A second output of coupler 50, the signal carried thereon denoted signal SREF, is coupled to a respective logarithmic amplifier 110 via a respective optional harmonic filter 70. In one embodiment, the path for signal SREF between coupler 50 and the associated optional harmonic filter 70 is arranged to be as short as possible.

Figure 1B:
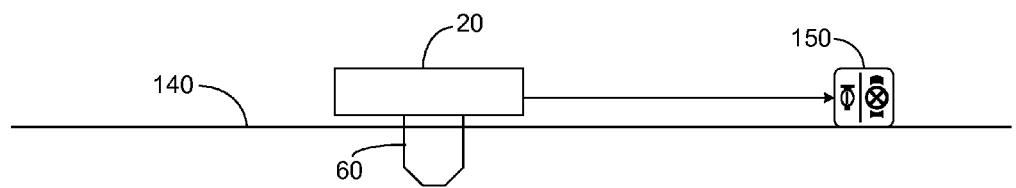
FIG. 1B illustrates a high level block diagram of the apparatus of FIG. 1A, wherein the probe is embedded in a target soil.

The output of each logarithmic amplifier 110 is coupled to a respective input of phase detector 120 and a respective input of difference circuit 130. The output of each of phase detector 120 and difference circuit 130 is coupled to a respective input of control circuitry 30. An output of control circuitry 30 is coupled to optional wireless transmitter 90, and the output of optional wireless transmitter 90 is coupled to optional antenna 100. In one embodiment, as illustrated in FIG. 1B, control circuitry 30 is in communication with a spigot 150 via optional wireless transmitter 90 and optional antenna 100. Alternately, communication between control circuitry 30 and spigot 150 may be via a wired communication without exceeding the scope. Spigot 150 is meant to represent any controlled watering source including sprinklers and irrigation systems without limitation.

In operation, as described in stage 1000, probe 60 is embedded in a target soil 140, in one embodiment to a depth of 6-19 inches. In stage 1010, signal generator 40 is arranged to generate signal S1, preferably a microwave signal. In one embodiment, signal S1 is at a frequency of about 900 MHz. In stage 1020, signal S1 is received at coupler 50, which couples a first portion of signal S1 to first end 66 of probe 60 as signal S2 and passes a second portion copy of signal S1, to the input of the associated logarithmic amplifier 110 via the associated optional harmonic filter 70, as signal SREF. Signal S2 advances through probe 60, where the speed of advancement is affected by the moisture content of target soil 140, and exits probe 60, at second end 68 as signal S3 and fed to the input of the associated logarithmic amplifier 110 via the associated optional harmonic filter 70.

In stage 1030, signals S3 and SREF are each optionally filtered by the respective harmonic filter 70 to remove any harmonics and in stage 1040 are each then amplified by the respective logarithmic amplifier 110 to be converted into a square wave, i.e. are squared. Harmonic filters 70 are optionally implemented to eliminate harmonics caused by the signal generator 40. Squared signals S3 and SREF, when measured at the outputs of the respective logarithmic amplifiers 110, exhibit a phase difference between each other responsive to two factors, a first factor of which is fixed and known, and a second factor of which is unknown. The first fixed factor is the difference in length between the path from coupler 50, through probe 60 to the respective logarithmic amplifier 110, i.e. the path of signals S2 and S3, versus the direct path from coupler 50 to the respective logarithmic amplifier 110, i.e. the path of signal SREF. The unknown factor is the moisture content of target soil 140 which affects the travel time of signal S2 through probe 60, as described below in relation to EQ. 2. In stage 1050, phase detector 120 detects the phase difference between signals S3 and SREF, the phase difference being received by control circuitry 30. In the embodiment where phase detector 120 is a multiplier exclusive OR type phase detector, the output of phase detector 120 is a DC voltage level which is proportional to the phase difference between signals S3 and SREF.

In optional stage 1060, the volumetric moisture content is calculated responsive to the received phase difference and responsive to a library of reference phase differences stored on memory 35, as will be described below.

The velocity of propagation of signal S2 through probe 60 is given as:

$$V = \frac{C}{\sqrt{Ka}} = \frac{L}{T} \qquad \text{EQ. 1}$$

where V is the velocity of propagation, C is the speed of light, L is the length of probe 60, T is the propagation time through probe 60 for signal S2 to output as signal S3, and Ka is the permittivity of target soil 140. After rearranging EQ. 1, the propagation time through probe 60 is given as:

$$T = \frac{L\sqrt{Ka}}{C} \qquad \text{EQ. 2}$$

The phase difference, between signals S3 and SREF is given as:

$$\Delta\Phi = \omega T \qquad \text{EQ. 3}$$

where $\Delta\Phi$ is the phase difference, w is the frequency of signals S3 and SREF in radians and T is the propagation time through probe 60. In the event that $\Delta\Phi$ exceeds $\pi$ radians then the output of the phase detector will reverse. It is therefore preferable to limit the $\Delta\Phi$ dynamic range between dry and saturated soil to less than $\pi$ radians by adjusting the effective length of the probe exposed to the material under test. Alternately, adjustment, control circuitry 30 may be arranged to track and resolve $\Delta\Phi$ greater than $\pi$ radians. Additionally, probe 60 electrical length may be selected so as to adjust the offset of the $\Delta\Phi$ dynamic range, i.e. how close it starts to 0 or $\pi$ radians.

After combining EQ. 2 and EQ. 3, the phase difference is given as:

$$\Delta\Phi = \omega \frac{L\sqrt{Ka}}{C} \qquad \text{EQ. 4}$$

The volumetric moisture content of target soil 140 is given as:

$$VMC = \left(\frac{Tm}{Tf} - \frac{Td}{Tf}\right) / \left(\frac{Ts}{Tf} - 1\right) \qquad \text{EQ. 5}$$

where: Tm is the propagation time of signal S2 through probe 60 to exit as signal S3 while embedded in target soil 140 with a volumetric moisture content of VMC; Tf is the propagation time of signal S2 through probe 60 to exit as signal S3 while probe 60 is in ambient air, which is determined according to the length of probe 60 and the speed of light; Td is the propagation time of signal S2 through probe 60 to exit as signal S3 while probe 60 is embedded in target soil 140 which is dry, i.e. with substantially zero moisture content; and Ts is the propagation time of signal S2 through probe 60 to exit as signal S3 while probe 60 is embedded in target soil 140 which is saturated.

The propagation times of EQ. 5 can be replaced with the phase differences between signals S2 and S3, and thus the volumetric moisture content is given as:

$$VMC = \left(\frac{\Delta\Phi m}{\Delta\Phi f} - \frac{\Delta\Phi d}{\Delta\Phi f}\right) / \left(\frac{\Delta\Phi s}{\Delta\Phi f} - 1\right) \qquad \text{EQ. 6}$$

where: $\Delta\Phi m$ is the phase difference between signals S3 and SREF when probe 60 is embedded in target soil 140 with a volumetric moisture content of VMC; $\Delta\Phi f$ is the phase difference between signals S3 and SREF when probe 60 is in the ambient air, which is known, as described above; $\Delta\Phi d$ is the phase difference between signals S3 and SREF when probe 60 is embedded in target soil 140 which is dry, i.e. with substantially zero moisture content; and $\Delta\Phi s$ is the phase difference between signals S3 and SREF when probe 60 is embedded in target soil 140 which is saturated.

Initially, reference phase differences $\Delta\Phi d$ and $\Delta\Phi s$ are determined by embedding probe 60 in target soil 140 in a dry condition and a saturated condition, respectively, performing stages 1010-1050 described above. The reference phase differences are stored in memory 35 as a reference table. As described above, in operation the phase difference between signals S3 and SREF is received at control circuitry 30. The volumetric moisture content of target soil 140 is then calculated according to EQ. 6, where $\Delta\Phi m$ is the received phase difference of signals S3 and SREF. In optional stage 1070, control circuitry 30 is arranged to control spigot 150 to adjust the irrigation amount of target soil 140 in order to maintain the volumetric moisture content within a predetermined range. In one embodiment, minimum and maximum volumetric moisture contents are further stored in memory 35 and in the event the determined volumetric moisture content falls below the stored minimum value, spigot 150 is enabled to provide irrigation. In the event the determined volumetric moisture content rises above the stored maximum value, spigot 150 is disabled to cease irrigation.

Alternately, in optional stage 1080, initially reference phase differences $\Delta\Phi d$ and $\Delta\Phi s$ are determined and stored in memory 35, as described above. As described above, in operation the phase difference between signals S3 and SREF is received at control circuitry 30. The received phase difference is compared to the stored phase differences and spigot 150 is controlled to adjust the irrigation amount of target soil 140 in order to maintain the desired phase difference to be between stored phase differences $\Delta\Phi d$ and $\Delta\Phi s$. Thus, the volumetric moisture content need not be determined, and control of spigot 150 may be performed directly responsive to the determined phase difference between signals S3 and SREF.

Figure 1C:
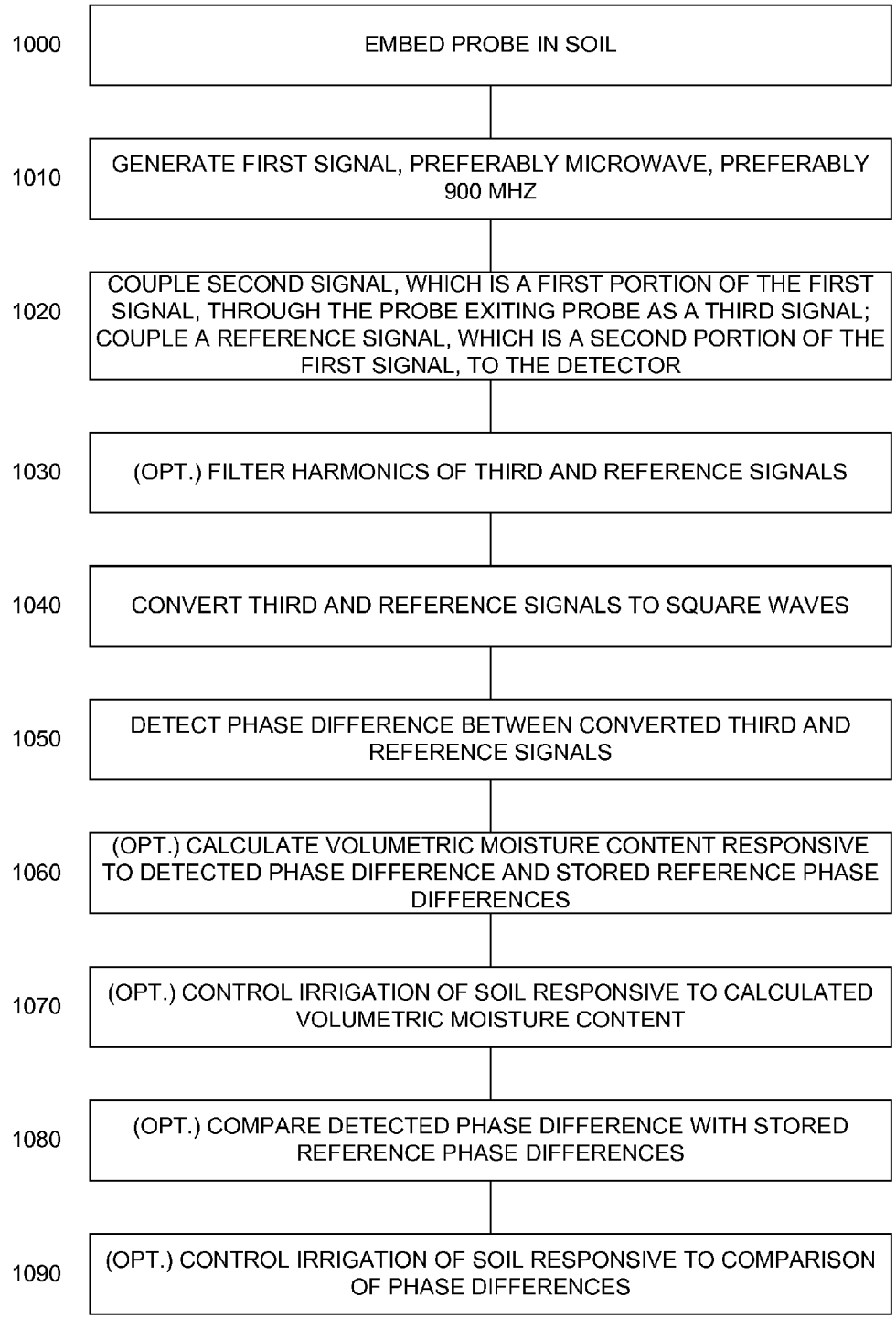
FIG. 1C illustrates a high level flow chart of the operation of the apparatus of FIGS. 1A-1B to assess volumetric moisture content of the target soil and control irrigation thereof.
Figure 1D:
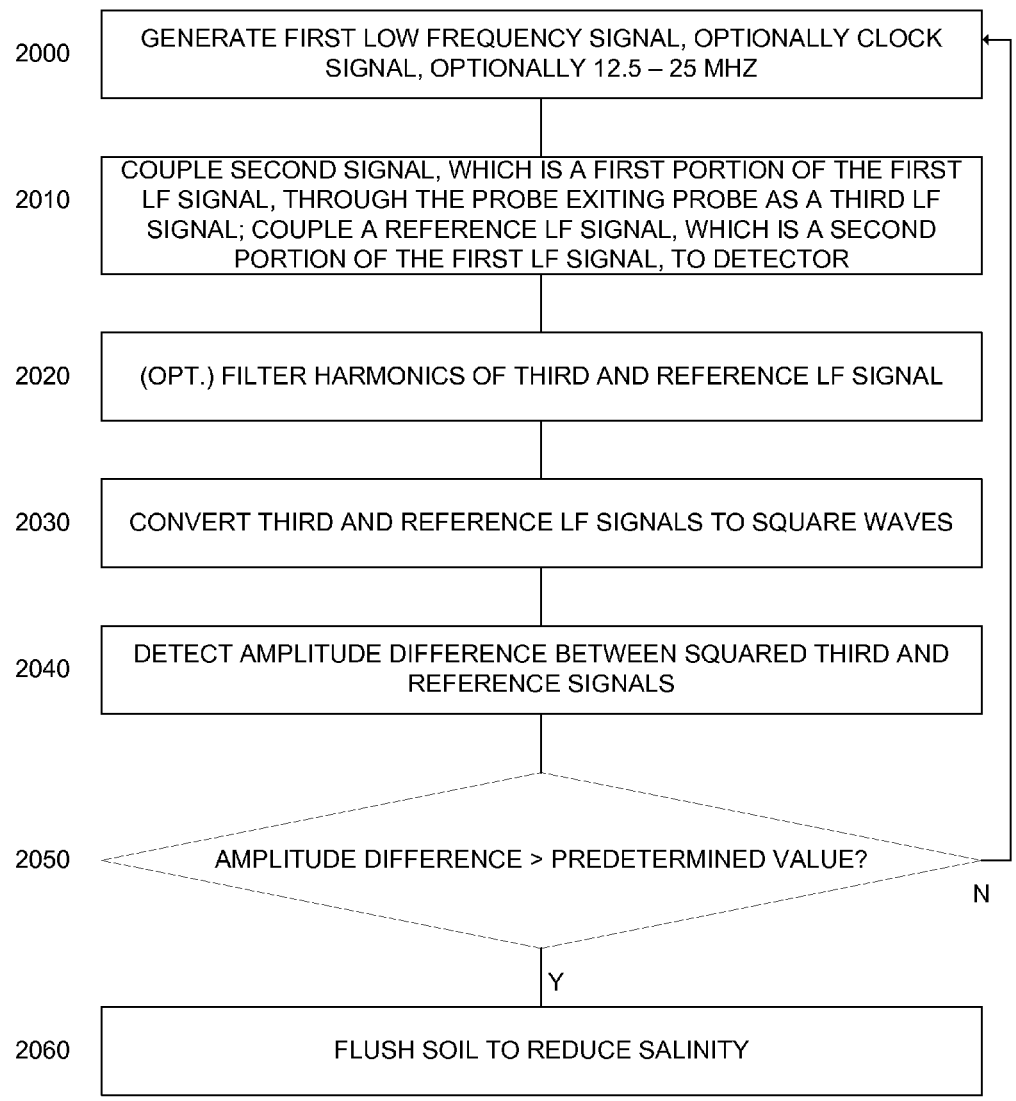
FIG. 1D illustrates a high level flow chart of the operation of the apparatus of FIGS. 1A-1B to assess the salinity of the target soil.

In one embodiment, the salinity of target soil 140 is further assessed, as described in FIG. 1D. In stage 2000, a first signal SLF1 is provided to coupler 50, in one embodiment signal SLF1 being the internal clock signal of control circuitry 30. In one embodiment, the frequency of signal SLF1 is 12.5-25 MHz. In stage 2010, signal SLF1 is received at coupler 50, which couples a first portion of signal SLF1 as signal SLF2 to first end 66 of probe 60, and couples a second portion of signal SLF1 as signal SLFREF to the input of the associated logarithmic amplifier 110 via the associated optional harmonic filter 70. Signal SLF2 advances through probe 60, where the amplitude thereof is affected by the salinity of target soil 140 and exits probe 60 at second end 68 as signal SLF3 and coupled to the input of the associated logarithmic amplifier 110 via the associated optional harmonic filter 70.

In stage 2020, signals SLF3 and SLFREF are each filtered by the respective optional harmonic filter 70 to remove any harmonics and in stage 2030 are each then amplified by the respective logarithmic amplifier 110 to be converted into a square wave. Signals SLF3 and SLFREF, when measured at the outputs of the respective logarithmic amplifiers 110, exhibit an amplitude difference between each other responsive to the salinity of target soil 140. In stage 2040, difference circuitry 130 detects the amplitude difference between signals SLF3 and SLFREF, the amplitude difference being received by control circuitry 30. In stage 2050, control circuitry 30 compares the detected amplitude difference of stage 2040 with a predetermined value. In the event the detected amplitude difference of stage 2040 is greater than the predetermined value, target soil 140 is considered to be too saline and in stage 2060 spigot 150 is controlled to flush target soil 140 in order to reduce the salinity. In the event that in stage 2050, the detected amplitude difference of stage 2040 is not greater than the predetermined value, stage 2000 is again repeated, preferably after a predetermined wait state (not shown).

Figure 2A:
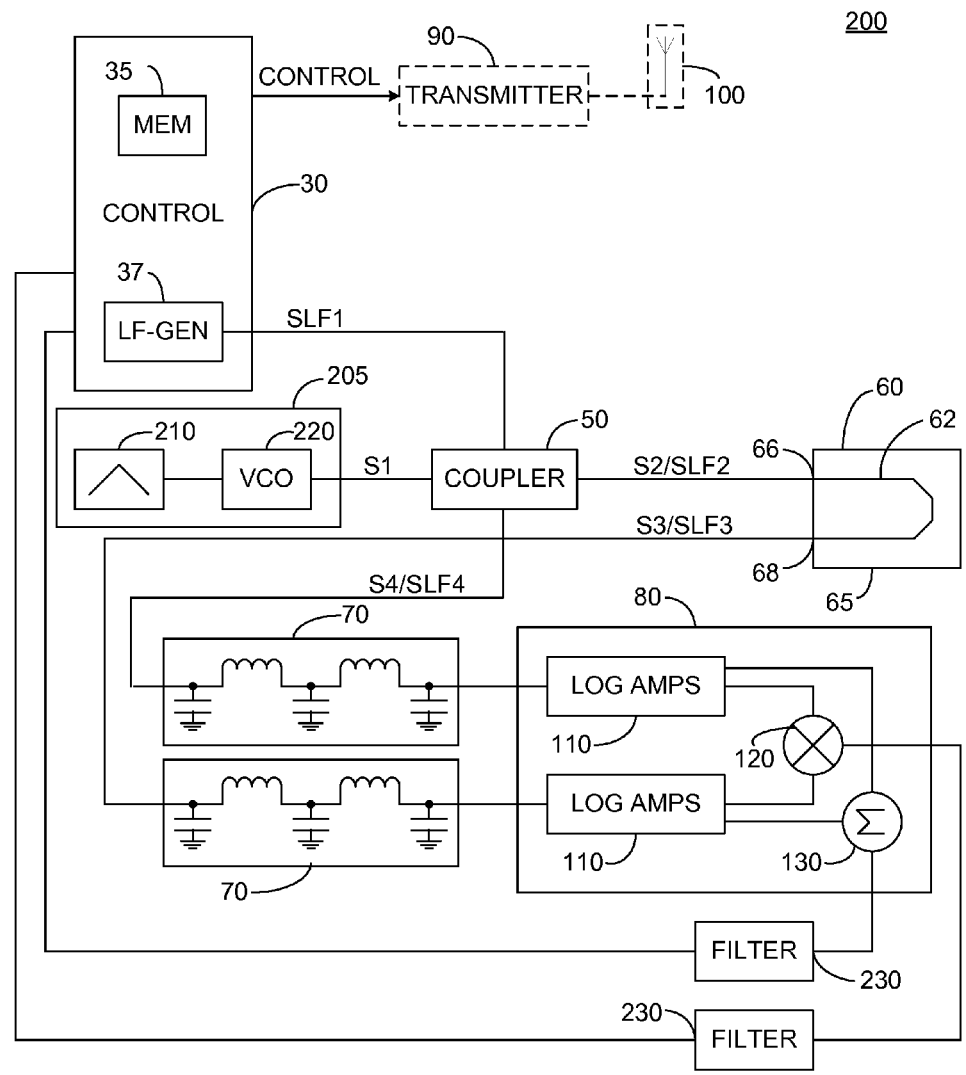
FIG. 2A illustrates a high level block diagram of an apparatus arranged to assess volumetric moisture content and salinity of a target soil and further control irrigation thereof, comprising a swept wave signal generator and a probe.
Figure 2B:
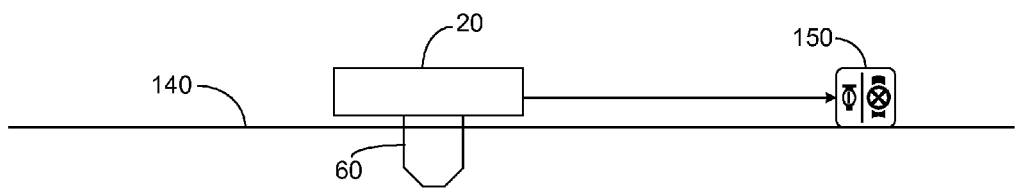
FIG. 2B illustrates a high level block diagram of the apparatus of FIG. 2A, wherein the probe is embedded in a target soil.

FIG. 2A illustrates a high level block diagram of an apparatus 200 for assessing volumetric moisture content comprising a swept frequency generator. Apparatus 200 is in all respects similar to apparatus 10 of FIG. 1A, with the exception that: signal generator 40 is replaced with a signal generator 205 comprising a triangular wave generator 210 and a voltage controlled oscillator (VCO) 220; and a filter 230 is provided at each of the outputs of phase detector 120 and difference circuit 130. FIG. 2B illustrates a high level block diagram of apparatus 200, wherein probe 60 is embedded in a target soil 140, the figures being described together. Harmonic filters 70 are optionally implemented to eliminate harmonics caused by the voltage controlled oscillator (VCO) 220.

Figure 2C:
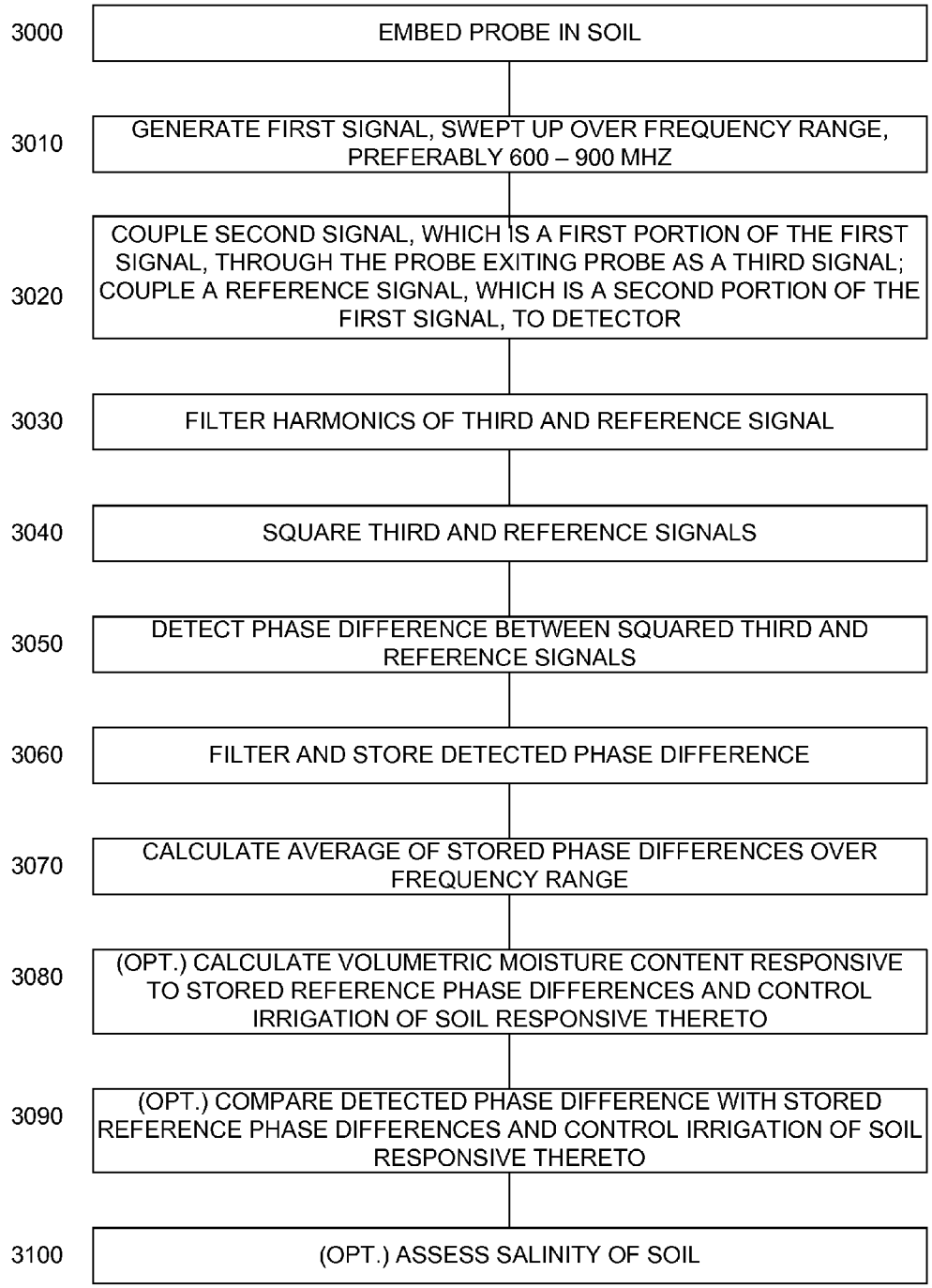
FIG. 2C illustrates a high level flow chart of the operation of the apparatus of FIGS. 2A-2B to assess volumetric moisture content and salinity of the target soil and control irrigation thereof.

In operation, as described in stage 3000 of FIG. 2C, probe 60 is embedded in a target soil 140, in one embodiment to a depth of 6-19 inches. In stage 3010, signal S1 is generated by signal generator 205. Particularly, triangular wave generator 210 is arranged to generate a triangular waveform which is received at the input of VCO 220. In one embodiment, the generated triangular waveform has a frequency of 1 kHz. Responsive to the received generated triangular waveform, VCO 220 generates signal S1 swept up over a predetermined frequency range. In one embodiment, the predetermined frequency ranged is 600-900 MHz. In stage 3020, signal S1 is received at coupler 50, which couples a first portion of signal S1 to first end 66 of probe 60 as signal S2 and passes a second portion copy of signal S1, to the input of the associated logarithmic amplifier 110 via the associated harmonic filter 70, as signal SREF. Signal S2 advances through probe 60, where the speed of advancement is affected by the moisture content of target soil 140, and exits probe 60, at second end 68 as signal S3 and fed to the input of the associated logarithmic amplifier 110 via the associated harmonic filter 70. In stage 3030, signals S3 and SREF are each filtered by the respective harmonic filter 70 to remove any harmonics and in stage 3040 are each then amplified by the respective logarithmic amplifier 110 to be converted into a square wave, i.e. are squared.

In stage 3050, phase detector 120 detects the phase difference between squared signals S3 and SREF. In stage 3060, the received phase difference is filtered by the respective filter 230 to remove any audio feed through signal at the repetition rate of the triangle wave sweeping the frequency of signal S1 and is then stored on memory 35. The phase difference is not uniform for each frequency, as in described above in relation to EQ. 3. In stage 3070 control circuitry 30 calculates an average of the phase differences stored on memory 35. Alternatively, the frequency for each measurement is determined responsive to communication between control circuitry 30 and triangular wave generator 210, and thus the change in T, i.e. the propagation time through probe 60 for signal S2 to output as signal S3, as a function of frequency is removed. In one embodiment, control circuitry 30 directly generates the triangular wave, thus controlling the frequency over time of signal S1.

In optional stage 3080, the volumetric moisture content of target soil 140 is calculated responsive to the calculated average of stage 3070 and responsive to the reference phase differences stored on memory 35, and spigot 150 is controlled responsive to the calculated volumetric moisture content of target soil 140, as described above in relation to optional stages 1060-1070 of FIG. 1C. Alternatively, in optional stage 3090, spigot 150 is controlled responsive to the difference between the calculated average phase difference of stage 3070 and stored reference phase differences to control the irrigation of target soil 140, as described above in relation to optional stages 1080-1090 of FIG. 1C. In optional stage 3100, the salinity of target soil 140 is assessed as described above in relation to stages 2000-2060 of FIG. 1D.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

The invention claimed is:

1. An apparatus for assessing at least one property of a target soil, the apparatus comprising:
   a microwave signal generator arranged to generate a first microwave signal, wherein the generated first microwave signal is a fixed frequency microwave signal;
   a detector;
   a probe comprising an electrical conductor exhibiting a first end and a second end removed from said first end, said probe arranged to be embedded in the target soil; and
   a coupler arranged to couple a first portion of the generated first microwave signal as a second microwave signal to the first end of said probe, and to couple a second portion of the generated first microwave signal as a microwave reference signal to a reference input of said detector, said second microwave signal exiting the second end of said probe as a third microwave signal, the second end of said probe carrying the third microwave signal connected to an input of said detector;
   said detector arranged to square each of said third microwave signal and said microwave reference signal and to output a phase difference signal indicative of the phase difference between the squared third microwave signal and the squared microwave reference signal; and
   a control circuitry coupled to the output of said detector and arranged to output an irrigation control signal responsive to said phase difference signal with the probe embedded in the target soil at present, said phase difference signal with the probe embedded in the target soil when the target soil is dry, and the phase difference signal with the probe embedded in the target soil when the target soil is saturated,
   said control circuitry is further arranged to:
      calculate a volumetric moisture content of the target soil responsive to the phase difference signal for the target soil at present with the probe embedded in the target soil, the phase difference signal when the target soil is dry with the probe embedded in the target soil,
      and the phase difference signal when the target soil is saturated with the probe embedded in the target soil,
      wherein the irrigation control signal is responsive to the calculated volumetric moisture content,
      wherein the volumetric moisture content (VMC) is calculated in accordance with:

$$VMC = \left(\frac{\Delta\Phi m}{\Delta\Phi f} - \frac{\Delta\Phi d}{\Delta\Phi f}\right) \bigg/ \left(\frac{\Delta\Phi s}{\Delta\Phi f} - 1\right),$$

where $\Delta\Phi m$ is the phase difference for the target soil at present, $\Delta\Phi f$ is the phase difference for ambient air, $\Delta\Phi d$ is the phase difference for the target soil when dry, and $\Delta\Phi s$ is the phase difference for the target soil when saturated.

2. The apparatus of claim 1, wherein said irrigation control signal is coupled to an irrigation system and arranged to alternately enable and disable irrigation responsive to said irrigation control signal.

3. The apparatus of claim 1, wherein the fixed frequency of said generated first microwave signal is approximately 900 Megahertz.

4. The apparatus of claim 1, further comprising a low frequency signal generator arranged to output a first low frequency signal, the first low frequency signal coupled to an input of the coupler, and wherein:
   said coupler is further arranged to couple a first portion of the first low frequency signal as a second low frequency signal to the first end of said probe, and to couple a second portion of the first low frequency signal as a low frequency reference signal to the reference input of said detector, said second low frequency signal exiting the second end of said probe as a third low frequency signal, the second end of said probe carrying the third low frequency signal to the input of said detector;
   said detector is further arranged to square said third low frequency signal and said low frequency reference signal and to output an amplitude difference signal indicative of the phase difference between the squared third low frequency signal and the squared low frequency reference signal; and
   wherein said control circuitry is arranged to assess the salinity of the target soil responsive to the amplitude difference signal with the probe embedded in the target soil.

5. The apparatus of claim 4, wherein said control circuitry is further arranged to output the irrigation control signal responsive to a condition of said amplitude difference signal so as to flush the target soil.

6. The apparatus of claim 4, wherein the low frequency first signal is in the range of 12.5-25 Megahertz.

7. The apparatus of claim 1, wherein said control circuitry is arranged to output the irrigation control signal so as to maintain the phase difference between the phase difference when the target soil is dry and the phase difference when the target soil is saturated.

8. A method of assessing at least one property of a target soil, the method comprising:

providing a probe constituted of an electrical conductor exhibiting a first end and a second end removed from said first end, said probe arranged to be embedded in the target soil;

generating a first microwave signal, said generated first microwave signal having a fixed frequency;

coupling a first portion of the generated first microwave signal as a second microwave signal to the first end of said provided probe, said second microwave signal exiting the second end of said probe as a third microwave signal;

coupling a second portion of the generated microwave first signal as a reference microwave signal;

squaring each of the third microwave signal and the reference microwave signal;

determining a dry phase difference between the squared third microwave signal and the squared reference microwave signal with the probe embedded in the target soil when the target soil is dry;

determining a saturated phase difference between the squared third microwave signal and the squared reference microwave signal with the probe embedded in the target soil when the target soil is saturated;

determining a present phase difference between the squared third microwave signal and the squared reference microwave signal for the target soil at present with the probe embedded in the target soil; and outputting an irrigation control signal responsive to said determined present phase difference, said determined dry phase difference and said determined saturated phase difference; and calculating a volumetric moisture content of the target soil responsive to the said determined present phase difference, said determined dry phase difference and said determined saturated phase difference, wherein the output irrigation control signal is output responsive to the calculated volumetric moisture content, determining an ambient phase difference between the squared third microwave signal and the squared reference microwave signal when the provided probe is in ambient air, wherein the volumetric moisture content (VMC) is calculated in accordance with $$VMC = \left(\frac{\Delta\Phi m}{\Delta\Phi f} - \frac{\Delta\Phi d}{\Delta\Phi f}\right) \bigg/ \left(\frac{\Delta\Phi s}{\Delta\Phi f} - 1\right),$$

where $\Delta\Phi m$ is said determined present phase difference, $\Delta\Phi f$ is said determined ambient phase difference, $\Delta\Phi d$ is said determined dry phase difference, and $\Delta\Phi s$ is said determined saturated phase difference.

9. The method of claim 8, further comprising:
alternately enabling and disabling irrigation responsive to said output irrigation control signal.

10. The method of claim 8, wherein said fixed frequency is approximately 900 Megahertz.

11. The method of claim 8, further comprising:
generating a first low frequency;
coupling a first portion of the generated first low frequency signal as a second low frequency signal to the first end of said provided probe, said second low frequency signal exiting the second end of said probe as a third low frequency signal;

coupling a second portion of the generated first low frequency signal as a reference signal;
squaring said third low frequency signal;
squaring said low frequency reference signal;
determining an amplitude difference between the squared third low frequency signal and the squared low frequency reference signal; and
assessing the salinity of the target soil responsive to the determined amplitude difference with the provided probe embedded in the target soil.

12. The method of claim 11, further comprising:
outputting the irrigation control signal further responsive to a condition of said determined amplitude difference so as to flush the target soil.

13. The method of claim 11, wherein the low frequency first signal is in the range of 12.5-25 Megahertz.

14. The method of claim 8, wherein said outputting of the irrigation control signal is arranged so as to maintain said determined present phase difference between said determined dry phase difference and said determined saturated phase difference.

15. An apparatus for assessing at least one property of a target soil, the apparatus comprising:
a microwave signal generator arranged to generate a first microwave signal, wherein the generated first microwave signal is a fixed frequency microwave signal;
detector;
a probe comprising an electrical conductor exhibiting a first end and a second end removed from said first end, said probe arranged to be embedded in the target soil; and
a coupler arranged to couple a first portion of the generated first microwave signal as a second microwave signal to the first end of said probe, and to couple a second portion of the generated first microwave signal as a microwave reference signal to a reference input of said detector, said second microwave signal exiting the second end of said probe as a third microwave signal, the second end of said probe carrying the third microwave signal connected to an input of said detector;
said detector arranged to output a phase difference signal indicative of the phase difference between the third microwave signal and the microwave reference signal; and
a control circuitry coupled to the output of said detector and arranged to output an irrigation control signal responsive to said phase difference signal with the probe embedded in the target soil at present, said phase difference signal with the probe embedded in the target soil when the target soil is dry, and the phase difference signal with the probe embedded in the target soil when the target soil is saturated,
wherein said control circuitry is further arranged to calculate a volumetric moisture content of the target soil responsive to the phase difference signal detected for the target soil at present, the phase difference signal detected when the target soil is dry and the phase difference signal detected when the target soil is saturated, wherein the volumetric moisture content (VMC) is calculated in accordance with:

$$VMC = \left(\frac{\Delta\Phi m}{\Delta\Phi f} - \frac{\Delta\Phi d}{\Delta\Phi f}\right) \bigg/ \left(\frac{\Delta\Phi s}{\Delta\Phi f} - 1\right),$$

where ΔΦm is the phase difference for the target soil at present, ΔΦf is the phase difference for ambient air, Δ101 d is the phase difference for the target soil when dry, and Δ101 s is the phase difference for the target soil when saturated,
and wherein the irrigation control signal is responsive to the calculated volumetric moisture content.

\* \* \* \* \*